Figure 1:
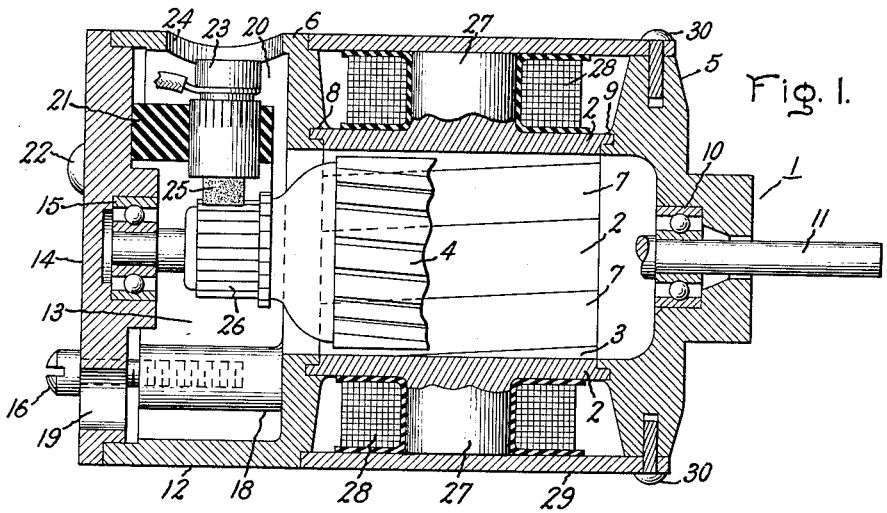

Aug. 30, 1955  P. W. THOMPSON ET AL  2,716,710
DYNAMOELECTRIC MACHINE STATOR CONSTRUCTION
Filed April 15, 1953

Inventors:
Paige W. Thompson,
Albert L. Olson,
by [signature]
Their Attorney.

United States Patent Office

2,716,710
Patented Aug. 30, 1955

2,716,710

DYNAMOELECTRIC MACHINE STATOR CONSTRUCTION

Paige W. Thompson and Albert L. Olson, Fort Wayne, Ind., assignors to General Electric Company, a corporation of New York Application April 15, 1953, Serial No. 348,885

12 Claims. (Cl. 310—258)

This invention relates to the stator construction of dynamoelectric machines and more particularly to the stator assembly of small motors.

In the past, small dynamoelectric machines, such as computer motors, have comprised many small parts and expensive and time consuming manufacturing and assembly operations have been required in order to produce a machine having the requisite tolerances. It is therefore desirable to provide a machine design wherein the manufacturing assembly operations and components are held to a minimum permitting ready assembly with simple tools.

It is therefore an object of this invention to provide an improved dynamoelectric machine stator construction incorporating the desirable features set forth above.

Further objects and advantages of this invention will become apparent and the invention will be better understood by reference to the following description and accompanying drawing, and the features of novelty which characterize this invention will be pointed out with particularity in the claims annexed to and forming a part of this specification.

In accordance with the preferred embodiment of this invention, a dynamoelectric machine stator assembly is provided comprising a plurality of equally spaced apart elongated longitudinally disposed pole piece members defining a bore for the rotor member of the machine. A pair of end flange members are provided formed of cast non-magnetic material, such as aluminum, encasing the ends of the pole face members and being preferably integrally jointed together by the cast non-magnetic material filling the spaces between the pole face members. One of the end flange members may have a bearing mounted therein for supporting one end of the shaft of the machine and the other end flange member may be cup-shaped defining a cavity in which a brushholder assembly is arranged. A cover member may be provided for closing the cavity defined by the cup-shaped end flange and may have another bearing mounted therein for supporting the other end of the machine shaft. The brushholder assembly may be mounted on this cover member extending into the interior of the cavity. One or more openings may be formed in the outer peripheral surface of the cup-shaped end flange member communicating with the cavity thereby permitting access to the brushholders. Poles may be formed on the exterior surfaces of the pole face members with field coils being arranged thereon. A yoke member surrounds the poles completing the magnetic circuit and may engage the two end flange members to complete the machine.

Figure 2:
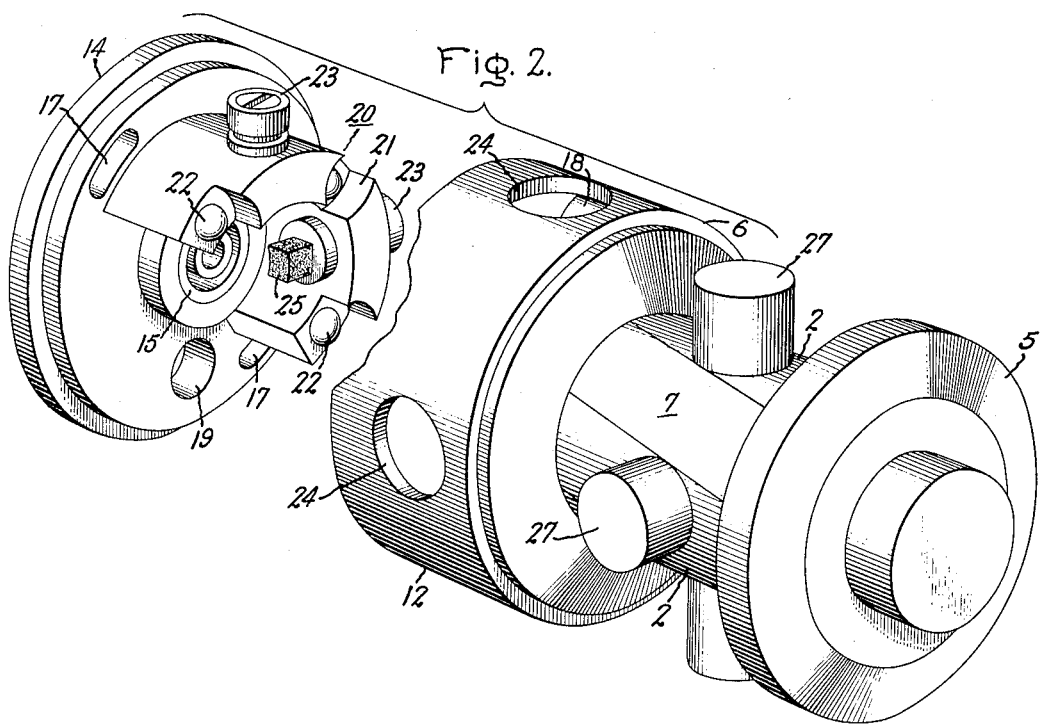

In the drawing,

Fig. 1 is a side elevational view, partly in section, illustrating the improved dynamoelectric machine stator construction of this invention; and Fig. 2 is a fragmentary exploded view further illustrating the improved construction of this invention.

Referring now to the drawing, there is shown a small direct current dynamoelectric machine, such as an aircraft computer motor, generally identified as 1. The stator assembly of this machine comprises four equally spaced apart longitudinally arranged elongated pole piece members 2 which define bore 3 for armature 4 of the machine. The pole piece members 2 are curved transversely to conform to the bore 3 and preferably longitudinally spiraled of skewed as best seen in Fig. 2. A pair of end flange members 5 and 6 are provided formed of suitable cast non-magnetic material, such as aluminum. The end flanges 5 and 6 encase the ends of pole piece members 2 and are integrally joined by the cast non-magnetic material filling the spaces between the pole piece members 2, as at 7. It is thus seen that the pole piece members 2 are cast into integral unit including end flanges 5 and 6 thus positioning the pole piece members 2 at the desired locations and forming a rigid assembly.

A suitable bearing 10, such as the anti-friction bearing shown in Fig. 1, is mounted in end flange 5 and rotatably supports one end of shaft 11 on which armature 4 is mounted.

End flange 6 is cup-shaped in configuration with axially extending flange portion 12 defining cavity 13 in which the brushholder assembly to be hereinafter described is positioned. Cavity 12 is closed by cover member 14 in which bearing 15 is mounted for supporting the other end of shaft 11. Cover member 14 is secured to end flange 6 by means of suitable screws 16 extending through slotted openings 17 into bosses 18 formed on the interior of axial flange 12. An opening 19 is formed in cover member 14 to accommodate the leads for the machine (not shown).

A brushholder assembly 20 is mounted on the cover member 14 extending into the cavity 13 and comprises a mounting member 21 formed of suitable insulating material and secured to the inner surface of cover member 14 by suitable rivets 22. Brushholder tubes 23 are mounted in mounting member 21 with openings 24 in flange portion 12 of end flange member 6 providing access thereto. Brushholders 23, which may be of any conventional type, accommodate brushes 25 which bear on commutator 26 of armature 4. The slotted opening 17 in cover member 14 permits limited radial adjustment of cover member 14 to adjust the position of the brushes 25 for proper commutation.

Poles 27 are formed on the outer surfaces of pole piece members 2 and suitable field coils 28 are arranged thereon. Yoke member 29 formed of suitable magnetic material surrounds the poles 27 to complete the magnetic circuit and engages end flanges 5 and 6, being held in position in any suitable manner, as by rivets 30.

It will be readily apparent that the cast material 7 joining end flange members 5 and 6 may be omitted if desired.

It will now be readily seen that this construction provides a single part incorporating an end flange arranged to mount a bearing, the pole pieces and poles, and another end flange formed as a housing for the brushholder assembly. The casting of the pole pieces integral with end flanges positions the pole pieces at the desired locations and greatly simplifies subsequent assembly operations. It will be readily apparent that this construction eliminates a number of manufacturing and assembly operations and parts thus permitting rapid assembly with simple tools.

While we have illustrated and described a particular embodiment of this invention, further modifications and improvements will occur to those skilled in the art. We desire that it be understood therefore that this invention is not limited to the form shown and we intend in the appended claims to cover all modifications which do not depart from the spirit and scope of this invention.

What we claim as new and desire to secure by Letters Patent of the United States is:

1. In a dynamoelectric machine, a stator assembly comprising a plurality of elongated equally spaced apart longitudinally disposed pole piece members defining a bore for the rotor of said machine, and a pair of end flange members formed of cast non-magnetic material respectively encasing the ends of said pole piece members and being integrally joined by said cast non-magnetic material filling the spaces between said pole piece members.

2. In a dynamoelectric machine, a stator assembly comprising a plurality of elongated equally spaced apart longitudinally disposed pole piece members defining a bore for the rotor of said machine, each of said pole piece members having a pole formed on the outer surface thereof, a pair of end flange members formed of cast non-magnetic material respectively encasing the ends of said pole piece members and being integrally joined by said cast non-magnetic material filling the spaces between said pole piece members, coils respectively positioned on said poles, and a yoke member surrounding said poles.

3. In a dynamoelectric machine, a stator assembly comprising a plurality of elongated equally spaced apart longitudinally disposed pole piece members defining a bore for the rotor of said machine, said pole piece members being respectively curved transversely to conform to said bore, and a pair of end flange members formed of cast non-magnetic material respectively encasing the ends of said pole piece members and being integrally joined by said cast non-magnetic material filling the spaces between said pole piece members.

4. In a dynamoelectric machine, a stator assembly comprising a plurality of elongated equally spaced apart longitudinally disposed pole piece members defining a bore for the rotor of said machine, said pole piece members having a longitudinal spiral, and a pair of end flange members formed of cast non-magnetic material respectively encasing the ends of said pole piece members and being integrally joined by said cast non-magnetic material filling the spaces between said pole piece members.

5. In a dynamoelectric machine, a stator assembly comprising a plurality of elongated equally spaced apart longitudinally disposed pole piece members defining a bore for the rotor of said machine, said pole piece members being respectively curved transversely to conform to said bore and having a longitudinal spiral, each of said pole piece members having a pole formed on the outer surface thereof, a pair of end flange members formed of cast non-magnetic material respectively encasing the ends of said pole piece members and being integrally joined by said cast non-magnetic material filling the spaces between said pole piece members, coils respectively positioned on said poles, and a yoke member surrounding said poles.

6. In a dynamoelectric machine, a stator assembly comprising a plurality of elongated equally spaced apart longitudinally disposed pole piece members defining a bore for the rotor of said machine, a pair of end flange members formed of cast non-magnetic material respectively encasing the ends of said pole piece members and being integrally joined by said cast non-magnetic material filling the spaces between said pole piece members, one of said end flange members being cup-shaped defining a cavity for accommodating a brushholder mechanism.

7. In a dynamoelectric machine, a stator assembly comprising a plurality of elongated equally spaced apart longitudinally disposed pole piece members defining a bore for the rotor of said machine, a pair of end flange members formed of cast non-magnetic material respectively encasing the ends of said pole piece members and being integrally joined by said cast non-magnetic material filling the spaces between said pole piece members, one of said end flange members having a bearing mounted therein, the other of said end flange members being cup-shaped defining a cavity for accommodating a brushholder mechanism, and a cover member for said cavity having another bearing mounted therein.

8. In a dynamoelectric machine, a stator assembly comprising a plurality of elongated equally spaced apart longitudinally disposed pole piece members defining a bore for the rotor of said machine, a pair of end flange members formed of cast non-magnetic material respectively encasing the ends of said pole piece members and being integrally joined by said cast non-magnetic material filling the spaces between said pole piece members, one of said end flange members being cup-shaped defining a cavity for accommodating a brushholder assembly, and a cover member for said cavity having a brushholder assembly mounted thereon and extending into said cavity.

9. In a dynamoelectric machine, a stator assembly comprising a plurality of elongated equally spaced apart longitudinally disposed pole piece members defining a bore for the rotor of said machine, a pair of end flange members formed of cast non-magnetic material respectively encasing the ends of said pole piece members and being integrally joined by said cast non-magnetic material filling the spaces between said pole piece members, one of said end flange members having a bearing mounted therein, the other of said end flange members being cup-shaped defining the cavity for accommodating a brushholder assembly, a cover member for said cavity having a bearing mounted therein, said cover member having a brushholder assembly mounted thereon and extending into said cavity.

10. In a dynamoelectric machine, a stator assembly comprising a plurality of elongated equally spaced apart longitudinally disposed pole piece members defining a bore for the rotor of said machine, each of said pole piece members having a pole formed on the outer surface thereof, a pair of end flange members formed of cast non-magnetic material respectively encasing the ends of said pole piece members and being integrally joined by said cast non-magnetic material filling the spaces between said pole piece members, coils respectively positioned on said poles, and a yoke member surrounding said poles and engaging said end flange members.

11. In a dynamoelectric machine, a stator assembly comprising a plurality of elongated equally spaced apart longitudinally disposed pole piece members defining a bore for the rotor of said machine, said pole piece members being respectively curved transversely to conform to said bore and having a longitudinal spiral, each of said pole piece members having a pole formed on the outer surface thereof, a pair of end flange members formed of cast non-magnetic material respectively encasing the ends of said pole piece members and being integrally joined by said cast non-magnetic material filling the spaces between said pole piece members, one of said end flange members having a bearing mounted therein, the other of said end flange members being cup-shaped defining a cavity for accommodating a brushholder assembly, the peripheral surface of said other end flange member having an opening formed therein communicating with said cavity for access to a brushholder, a cover member for said cavity having a bearing mounted therein, said cover member having a brushholder assembly mounted thereon and extending into said cavity, coils respectively positioned on said poles, and a yoke member surrounding said poles and engaging said end flange members.

12. In a dynamoelectric machine, a stator assembly comprising a plurality of elongated equally spaced apart longitudinally disposed pole piece members defining a bore for the rotor of said machine, and a pair of end flange members formed of cast non-magnetic material respectively encasing the ends of said pole piece members.

References Cited in the file of this patent

UNITED STATES PATENTS

| 1,748,242 | Papst | Feb. 25, 1930 |
|---|---|---|
| 1,957,380 | Barlow | May 1, 1934 |
| 2,181,418 | Cohen et al. | Nov. 28, 1939 |
| 2,325,915 | Naul | Aug. 3, 1943 |
| 2,391,005 | Bryan | Dec. 18, 1945 |
| 2,548,133 | Treat | Apr. 10, 1951 |
| 2,607,816 | Ryder et al. | Aug. 19, 1952 |